United States Patent [19]
Elliott

[11] Patent Number: 5,592,437
[45] Date of Patent: Jan. 7, 1997

[54] DATA COLLECTION AND RELAY CIRCUIT FOR TOWED HYDROPHONE ARRAY

[75] Inventor: Bruce Elliott, Plano, Tex.

[73] Assignee: Whitehall Corporation, Dallas, Tex.

[21] Appl. No.: 126,064

[22] Filed: Sep. 23, 1993

[51] Int. Cl.⁶ .................. G01V 1/22; H03G 3/20
[52] U.S. Cl. .................. 367/21; 340/521; 340/522; 340/825.08
[58] Field of Search .................. 367/15, 21, 134; 340/853.2, 853.9, 517, 521, 522, 825.08; 181/107

[56] References Cited

U.S. PATENT DOCUMENTS

| | | | |
|---|---|---|---|
| 3,525,072 | 8/1970 | Born et al. | 367/21 |
| 3,996,553 | 12/1976 | Siems et al. | 367/21 |
| 4,092,629 | 5/1978 | Siems et al. | 367/15 |
| 4,816,904 | 3/1989 | McKenna et al. | 358/84 |
| 4,967,400 | 10/1990 | Woods | 367/21 |
| 5,185,708 | 2/1993 | Hall et al. | 364/550 |
| 5,206,835 | 4/1993 | Beaudual | 367/21 |
| 5,291,459 | 3/1994 | Anderson | 367/134 |

FOREIGN PATENT DOCUMENTS 0039934 3/1985 Japan.
1631542 2/1991 U.S.S.R. .

*Primary Examiner*—Nelson Moskowitz
*Attorney, Agent, or Firm*—Hitt Chwang & Gaines, P.C.

[57] ABSTRACT

Disclosed is a programmable data collection and relay circuit for a towed hydrophone array. The circuit is designed to prepare data concerning operation of the array to be interleaved with substantive data produced by the hydrophones to produce a single data stream for transmission to recording equipment. The circuit comprises (1) a plurality of sensor inputs, each of the sensor inputs adapted to be coupled to a sensor capable of sensing a physical characteristic within the towed hydrophone array, (2) a circuit for polling at least a portion of the plurality of sensor inputs to determine values of the inputs, (3) a circuit for storing programmed data concerning which of the plurality of inputs is to be polled and (4) a circuit for serially placing the input values in condition for insertion into a data stream transmitted along the towed hydrophone array.

28 Claims, 3 Drawing Sheets

DATA COLLECTION AND RELAY CIRCUIT FOR TOWED HYDROPHONE ARRAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed, in general, to collection and transmission of data within towed acoustic arrays used in geologic exploration and, more specifically, to a circuit for serially collecting data from a plurality of operational nonacoustic sensors within the array for synchronous interleaved insertion into a stream of digital data from hydrophones within the array.

BACKGROUND OF THE INVENTION

It is now common practice to explore the oceans of the earth for deposits of oil, gas and other valuable minerals by seismic techniques in which an exploration vessel imparts an acoustic wave into the saltwater, typically by use of a compressed air "gun". The acoustic wave travels downwardly into the sea bed and is reflected at the interfaces between layers of materials having varying acoustic impedances. The wave travels back upwardly where it is detected by microphone or "hydrophone" elements in a streamer or array towed by the vessel to yield information regarding characteristics of the underwater material and structures.

A towed acoustic array comprises a plurality of pressure-sensitive hydrophone elements enclosed within a waterproof sheath and electrically coupled to recording equipment onboard the vessel. Each hydrophone element within the towed array is designed to convert the mechanical energy present in pressure variations surrounding the hydrophone element into electrical signals. Conductors carry the signals from the hydrophone elements to the recording equipment (so-called "acoustic data").

In addition to acoustic data, it is also important to collect and transmit data concerning operational status of the array to the vessel (so-called "nonacoustic data"). Nonacoustic data comprises physical characteristics of interest.

For example, during operation, the towed array is surrounded by saltwater. A hydrophone element is a high impedance device, therefore any saltwater coming into contact with the element causes leakage paths for electrical current present in the leads thereto, either severely distorting the signal produced by the hydrophone element or shorting the hydrophone element entirely. Other circuitry within the array may malfunction due to contact with saltwater. Therefore, it is very important to keep the hydrophone element dry and to notify persons on the vessel should saltwater invade any of the modules in the array.

Further, it may be important to know that electric power delivered to components within the array is of the appropriate voltage or amperage to ensure proper operation of the components.

It may also be important to know the depth at which the array is operating and the temperature of the water surrounding the array to be able to judge the acoustic data properly.

From one job to another however, these physical characteristics may vary in importance. For instance, it may be critical in one application to know the temperature of the array and utterly inconsequential in another application. Thus, although a manufacturer may have a standard design for an array, the design may have to be modified for each individual array produced, depending upon what nonacoustic sensors are required within the array.

At one time, the analog signals output by the hydrophones were transmitted to the vessel where they were digitized and stored for later processing and analysis. In such systems, totally separate analog data channels were employed for acoustic and nonacoustic data. Since these analog channels were potentially very long (on the order of miles) and since interference from stray electromagnetic interference within the array is always present to a degree, the data transmission rates on these analog channels were relatively low.

Today, it is possible to construct towed arrays having digital data channels. With digital data transmission, data transmission rates are higher and, with proper attention to electromagnetic interference, data fidelity is maintained from the hydrophone to the recording equipment.

For instance, U.S. Pat. No. 3,996,553, that issued on Dec. 7, 1976 is directed to a plurality of data acquisition units connected to a central signal processor through a common telemeter link. The telemeter link includes a data channel, an interrogation channel and a control channel. The central signal processor sends an interrogation signal through the interrogation channel to the data acquisition units. As each data acquisition unit recognizes the interrogation signal, it transmits its acquired data back up to the central processor through the data channel. Any selected data acquisition unit, when it receives a control signal through the control channel at the same time that it receives an interrogation signal through the interrogation channel, can be caused to perform a function different from all other units. The signal propagation velocity through the control channel is different from the signal propagation velocity through the interrogation channel. One of the two signals may be transmitted through the faster channel at a selected time later than the other of the two signals is transmitted through the slower channel. The selected time difference between the transmission of the two signals is proportional to the ratio of signal propagation delay difference between channels. Accordingly, the signal propagating through the faster channel will overtake and intercept the signal propagating through the slower channel at the selected data acquisition unit. Each data acquisition unit may have one or more input channels. Each input channel is connected in turn to the data channel through a stepping switch or multiplexer. The interrogation signal may exist in one of two or more states. In the first state, the interrogation signal resets the multiplexer, in the second state, the interrogation signal advances the multiplexer to the next input channel in sequence.

Thus, this system allows for control signals to command changes of state within the individual multiplexers in the system.

In a similar vein, U.S. Pat. No. 4,092,629, that issued on May 30, 1978, is directed to a seismic sensor cable assembly having 50 cable sections (or modules) and much of the seismic data processing electronics decentralized into the cable structure itself. The cable assembly is coupled to a central station mounted in a recording vehicle. The central station includes recording circuitry and apparatus to receive, process and record digital data words from a data link in the cable assembly and circuitry for transmitting control signals into an interrogation link in the cable assembly. The electrical output of each sensor unit constitutes a separate input channel. The cable sections are spaced apart and interconnected by small diameter, cylindrical connector modules (not to be confused with the modules containing the hydrophones) that contain a transceiver unit for processing the signals from ten sensor units in an associated cable section contained within each transceiver unit is a multiplexer having a plurality of filtered input channels coupled respectively to the elemental sensor units, and an output. In response to a first interrogation pulse transmitted through the interrogation link from the central station unit, the multiplexer advances to a selected input channel to acquire a first analog data sample. A second interrogation pulse sequences the respective multiplexers in all 50 modules to select a second channel for sampling and digitizing to provide digital data words for the respective second channels. The self-clocking phase-encoded data words transmitted from the respective transceiver associated with each cable section are ordered in accordance with the propagation delay time of the interrogation link between the central station and the respective transceiver units. Self-clocking data words from corresponding channels within the respective transceiver units are ordered in accordance with the channel-select sequence during a scan cycle. Although there is a provision for nonacoustic data to be sensed and placed along with acoustic data into the data channel, there is no circuitry for allowing preprogramming of the number, characteristics and order of nonacoustic sensors to be used in the array.

Unfortunately, most arrays constructed to this point still employed separate channels for transmission of acoustic and nonacoustic data. These arrays suffered the extra cost, weight and reliability penalties brought about by complicating the structure. Even arrays having unified acoustic and nonacoustic data channels, whether digital or analog, were nonprogrammable.

What is needed in the art is a towed array having a capability to more efficiently integrate acoustic and nonacoustic data into a single digital channel. Toward that end, what is needed is a circuit for collecting and preparing such nonacoustic data for transmission along with the acoustic data in a synchronized form. Finally, the prior art has failed to provide a flexible nonacoustic data collection circuit, one that is programmable to take into account different sensor types, numbers and sensing orders.

SUMMARY OF THE INVENTION

To address the above-noted deficiencies, the primary object of the present invention is to provide a circuit designed to prepare data concerning operation of a towed hydrophone array (nonacoustic data) to be interleaved with substantive data produced by the hydrophones (acoustic data) to produce a single data stream for transmission to recording equipment. Because many different sensor types, combinations and permutations are possible, it is further a primary object of the present invention to provide a circuit that is programmable to adjust for the many possible sensor types and configurations.

In the attainment of the above-described primary objects, the present invention provides a data collection and relay circuit comprising (1) a plurality of sensor inputs, each of the sensor inputs adapted to be coupled to a sensor capable of sensing a physical characteristic within the towed hydrophone array, (2) means for polling at least a portion of the plurality of sensor inputs to determine values of the inputs, (3) means for storing programmed data concerning which of the plurality of inputs is to be polled and (4) means for serially placing the input values in condition for insertion into a data stream transmitted along the towed hydrophone array. In a preferred embodiment, the data collection and relay circuit further comprises means for storing programmed data concerning an order in which to poll the plurality of inputs. This allows even the order of polling to be adjusted as needed.

There are many types of sensors that may be placed within a hydrophone module to yield useful information concerning the operational status of each module within the array. Thus, the physical characteristic being sensed may be any one or a combination of: temperature, depth, voltage, fluid invasion and tension. Those skilled in the art will readily understand that other physical characteristics pertaining to the array or equipment used with the array are possible and within the scope of the present invention.

The data collection and relay circuit of the present invention is designed to operate most advantageously in a digital environment wherein data are transferred according to a preestablished protocol. In such digital environments, synchronization of the various digital components rids a need for packeting the data for asynchronous transmission and receipt. Thus, because it is most advantageous to transmit data synchronously, the data collection and relay circuit of the present invention preferably includes means for synchronizing an operation of the data collection and relay circuit with the data stream. In the illustrated embodiment, synchronization is accomplished by means of a master clock signal transmitted to the data collection and relay circuit, among other components.

In a preferred embodiment, the data collection and relay circuit of the present invention is provided with means for receiving downlink commands, the downlink commands governing an operation of the data collection and relay circuit. Downlink commands are defined, for purposes of the present invention, as commands sent to the array from an external source, such as equipment onboard the towing ship, that direct the array to perform an action, such as to reset the components within the array (including the data collection and relay circuit of the present invention), enter a calibration mode in which the array may be tested and adjust rates of data transfer from the array as appropriate. Obviously, this is not a complete list of possible downlink commands.

The data collection and relay circuit of the present invention is primarily directed to the task of accessing and presenting data for insertion into the data stream that comprises acoustic data from the hydrophones in the array. In a preferred embodiment, the data collection and relay circuit presents the data, in the form of the input values, in proper order to a combiner/repeater unit for inserting the input values into the data stream. The combiner/repeater unit acts as a buffer to store the data pending synchronous insertion into a packet of data in the data stream. The data stream, in the preferred embodiment, comprises individual frames having leading and/or trailing control bits. Each frame contains both acoustic and nonacoustic data.

In the illustrated embodiment of the present invention, voltage and fluid invasion sensors are coupled directly to ones of the plurality of sensor inputs on the data collection and relay circuit itself. Other sensors are coupled to the data collection and relay circuit by means of a sensor channel that is, itself, coupled to one of the plurality of sensor inputs. The sensor channel allows a plurality of external sensors to be coupled thereto. The sensor channel couples a selected one of the plurality of external sensors to the one sensor input at a time. Therefore, the sensor channel polls the sensors tied to it and is, itself, polled by the data collection and relay circuit.

In a preferred embodiment, the data collection and relay circuit is implemented in a programmable gate array. Instead of providing a hard-wired gate array, the gate array of the present invention allows for programming of data concerning the sensors and the order in which they are to be polled. The programmable gate array is more power-efficient than a programmable microprocessor (also within the scope of the invention). This is of substantial concern in a towed array.

Finally, in a preferred embodiment, the storing means comprises programmable read-only memory ("PROM"). This allows for programming by a PROM-programmer (or "burner") during manufacture of the array, ensuring that the programmed data is non-volatile.

In the attainment of the above-noted objects, features and advantages, a preferred embodiment of the present invention is incorporated in a towed hydrophone array comprising a hydrophone module, the module comprising a cylindrical sleeve having a plurality of hydrophone assemblies and a suspending material therein, the suspending material adapted to resiliently secure the hydrophone assemblies within the sleeve, the sleeve further containing a fluid therein, the fluid giving the hydrophone module a preselected specific gravity, the hydrophone module including a programmable data collection and relay circuit, comprising (a) a plurality of sensors, each of the sensors capable of sensing a physical characteristic within the towed hydrophone array, (b) a programmable controller coupled to each of the plurality of sensors to be capable of polling at least a portion of the plurality of sensors to determine values of the inputs, (c) a memory capable of storing programmed data concerning which of the plurality of sensors is to be polled, (d) a procedure operable within the programmable controller capable of selectively polling at least the portion as a function of the stored program data and serially placing the input values in condition for insertion into a data stream transmitted along the towed hydrophone array and (e) means for acting in accordance with downlink commands to reset the circuit, the circuit residing within a fluid-resistant container suspended in the suspending material within the hydrophone module.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
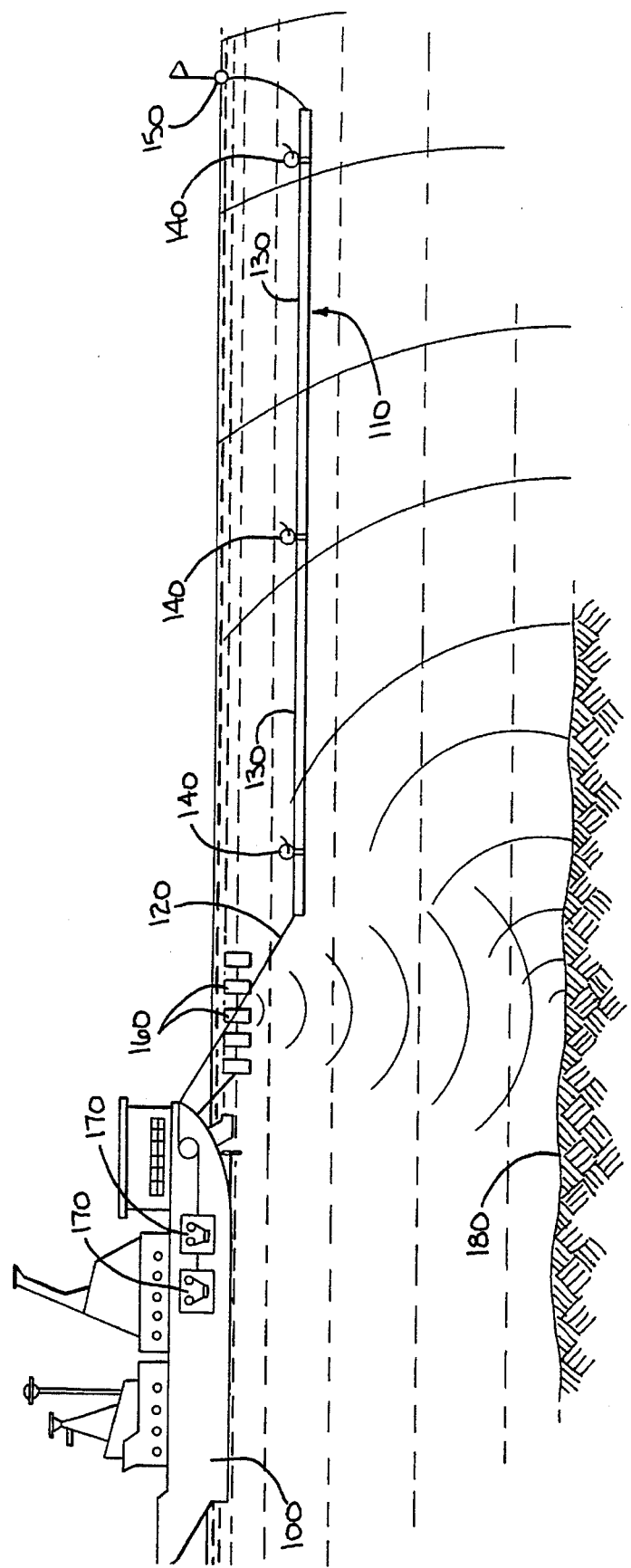
FIG. 1 illustrates an elevational view representing a towed array in operation.

Referring initially to FIG. 1, illustrated is an elevational view representing a towed array in operation. A seismic exploration vehicle 100 tows a streamer cable 110 behind it by way of a tow cable 120. The streamer 110 may comprise a rear buoy 150 if necessary. The streamer 110 is additionally provided with one or more leveling devices or "birds" 140 which serve precisely to regulate the depth of the streamer 110 within the water. The seismic vessel also tows compressed air guns 160 or other sources of acoustic energy which generate an acoustic wave in the water which travels downwardly as shown, reflects at interfaces within the sea bed 180 and is detected by the hydrophones of the streamer 110. As well described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
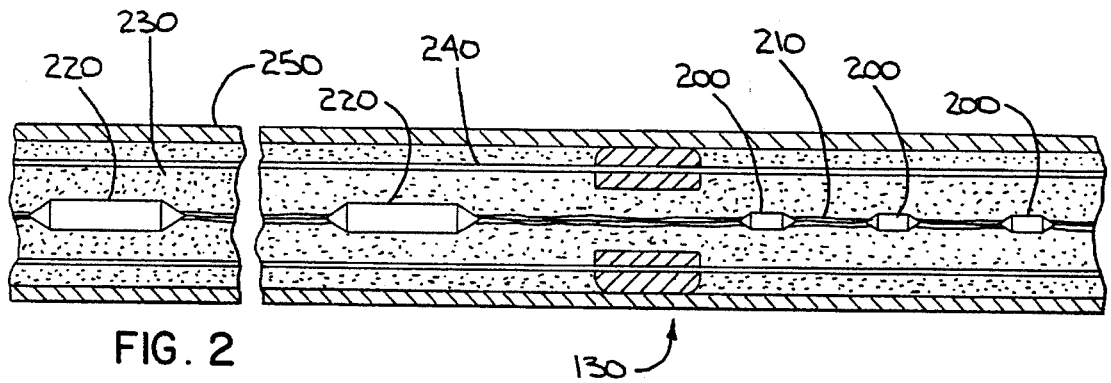
FIG. 2 illustrates a partial cross-sectional view of a typical module 130 of FIG. 1.

Turning now to FIG. 2, illustrated is a partial cross-sectional view of a typical module 130 of FIG. 1. The module 130 comprises a plurality of hydrophone assemblies 200 joined to each other by electrical cables 210. The electrical cables 210 feed into various data processing and transmission units 220 (such as the data collection and relay circuit of the present invention) spread along a length of the module 130. An open-cell foam 230 and tensioning wires 240 reside within a waterproof jacket 250. The foam 230 laterally suspends the hydrophone assemblies 200 and the units 220 therein and provides a surface suitable for longitudinally fixing the various units 220 in a relatively stable spaced-apart relationship along the length of the module 130. Maintenance of this spaced-apart relationship of the hydrophone assemblies 200 is important to proper operation of the array because the phase of signals produced by the hydrophone array in response to pressure wave impingement is a function of hydrophone spacing.

The tension cables 240 are used to carry pulling forces generated by the towing vessel and transmitted down the towed array while it is under tow, thereby relieving the cables 210, the jacket 250 and other structures within the jacket 250 from this stress. A fill fluid having a certain desired specific gravity is entrained within the open cell foam 230. This fill fluid is chosen such that, when taken as a whole, the module has a certain desired specific gravity, preferably a neutral buoyancy with respect to sea water so as to minimize effort on the part of the birds to maintain a desired array depth.

Figure 3:
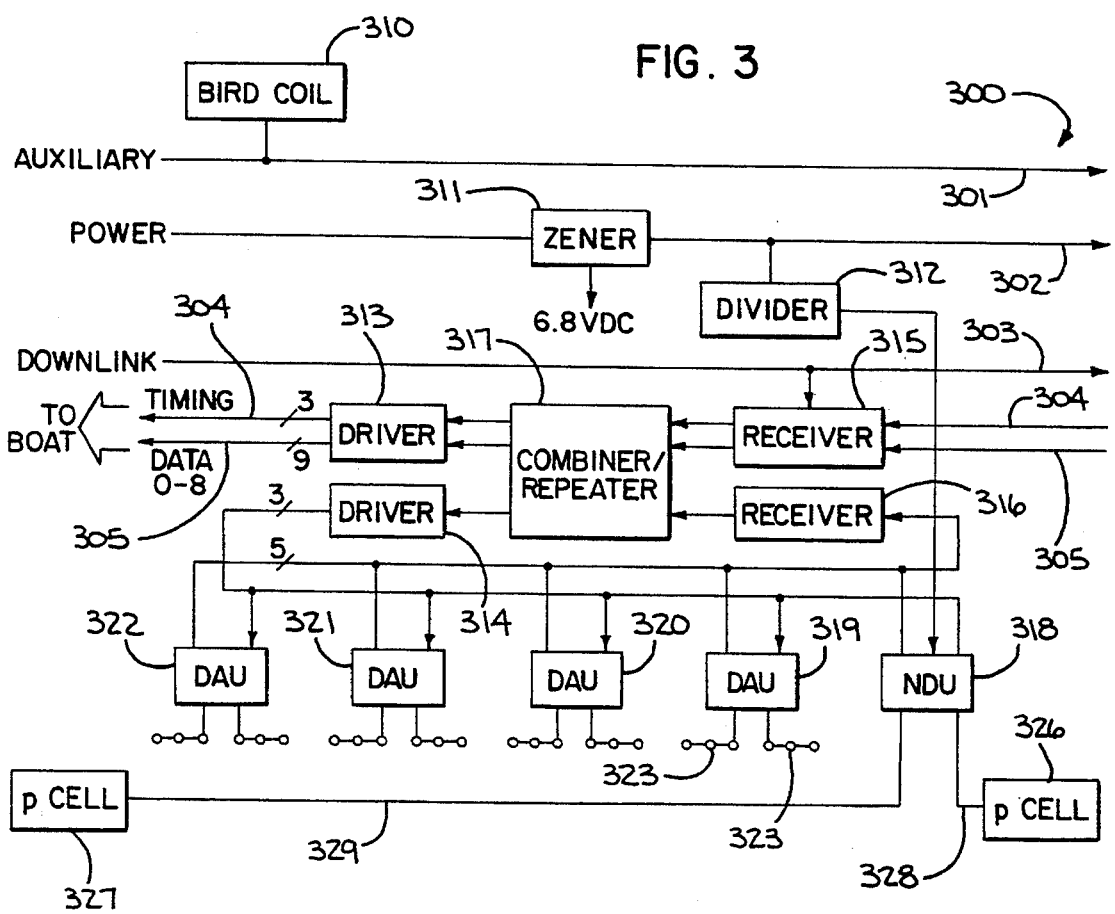
FIG. 3 illustrates a block diagram of an overall digital data system for a towed array that forms the environment for the present invention.

Turning now to FIG. 3, illustrated is a block diagram of an overall digital data system for a towed array module that forms the environment for the present invention. A digital bus 300 is, in a preferred embodiment of the present invention, comprised of twisted-pair wire.

The bus 300 is divided into an auxiliary bus 301, a power bus 302, a downlink bus 303, a timing bus 304 and a combined acoustic/nonacoustic data bus 305. The auxiliary bus 301 is used, among other things to carry signals that are inductively transmitted to one of a plurality of birds (not shown) via a bird coil 310. The power bus 302 carries relatively high voltages (on the order of several hundred volts). A zener diode 311 removes a portion of this voltage in each of the many modules within the array to provide, in a preferred embodiment, 6.8 volts to each module. A divider 312 supplies this voltage to an input on a nonacoustic data unit ("NDU") 318 that embodies the data collection and relay circuit of the present invention. This allows the NDU 318 to detect whether the module is receiving sufficient power and to transmit an indication of the power level to the seismic exploration vehicle 100 of FIG. 1 in a manner described more fully in conjunction with FIG. 4.

For purposes of the present invention, nonacoustic data is defined as all data other than data acquired through the hydrophones. This includes temperature measurements, depth measurements, voltage measurements or NDU status information. In terms of bandwidth of the total amount of data transmitted, nonacoustic data typically makes up about one percent. Therefore, the majority of data transmitted through the array is acoustic data.

The downlink bus 303 receives downlink commands from the seismic exploration vehicle 100, delivering the downlink commands to various components within the array, including the NDU 318. The timing bus 304 carries synchronizing clock signals throughout each module in the array to allow the components therein to work in concert. The NDU 318 is not coupled to the timing bus 304 and operates independently thereof in a manner to be described in connection with FIG. 4. The data bus 305 carries both the acoustic data derived from the hydrophones within the array and the nonacoustic data derived from nonacoustic sensors coupled to the NDU 318 in the form of interleaved packets. Data are arranged within the packets in an order representing the module order within the array.

The timing and data buses 304,305 enter a receiver 315 where packets thereon (derived from modules behind the one shown) are buffered and transmitted therefrom into a combiner/repeater unit ("CRU") 317, serving to combine the packets with acoustic and nonacoustic data derived from the module shown (and buffered in a receiver 316) into revised packets. These revised packets are transmitted to the next module via a driver 313. The CRU 317 also feeds another driver 314 which serves to coordinate the operation of a plurality of acoustic data acquisition units ("DAUs") 319, 320, 321, 322 via a local timing bus 324. Each of the DAUs 319, 320, 321, 322 communicates with a plurality of hydrophones, representationally referenced as hydrophones 323. The output from the DAUs 319, 320, 321, 322 is fed to the receiver 316 for injection into the data stream of packets on the data bus 305 via a local data bus 325.

Also providing data to the receiver 316 is the NDU 318. The NDU 318 receives timing and downlink commands via the local timing bus 324 and supplies nonacoustic data to the receiver 316 via the local data bus 325. Again, the receiver 316 acts as a buffer for the data prior to entering the CRU 317 for injection into the main data stream. In addition to deriving local module voltage from the divider 312, the NDU 318 detects saltwater invasion via permeability sensors ("Rho cells") 326, 327 via respective lines 328, 329.

Figure 4:
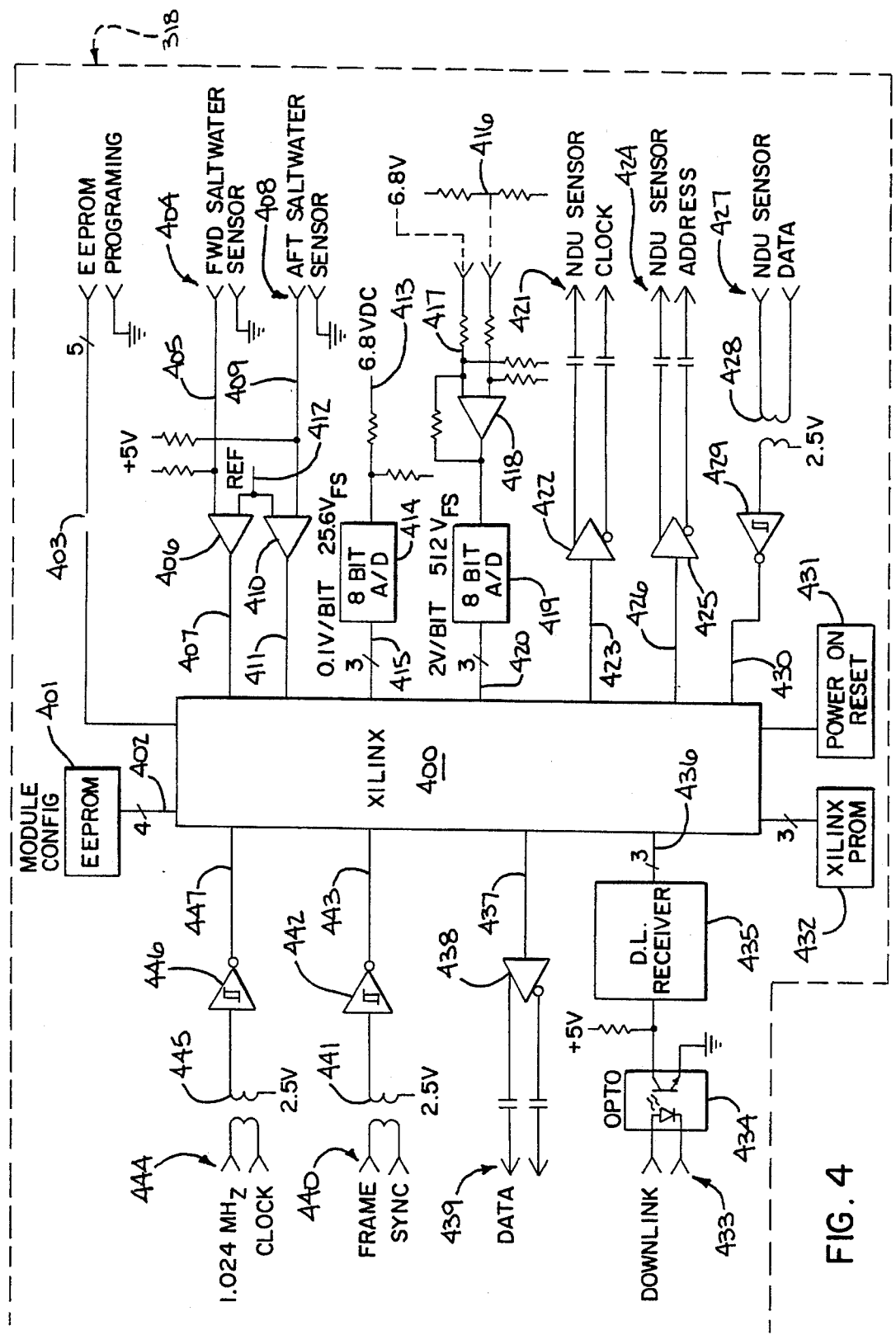
FIG. 4 illustrates a block diagram of a preferred embodiment of the data collection and relay circuit of the present invention.

Turning now to FIG. 4 and with continuing reference to FIG. 3, illustrated is a block diagram of a preferred embodiment of the data collection and relay circuit of the present invention. The circuit is embodied in the NDU 318 of FIG. 3. At the heart of the NDU is a controller 400 that, in a preferred embodiment of the present invention, is a programmable gate array controller, such as the XC 3030 manufactured by the Xilinx Corporation. Attached hereto and incorporated herein by reference as Exhibits A and B are source code listings of the instructions necessary to program the XC 3030 controller 400 to operate as an NDU. Those skilled in the art can employ the source code listings to enable the present invention. Other controllers, such as microprocessor-based controllers, are also suitable for use and are within the scope of the present invention.

A memory means for storing data 401 is coupled by a bus 402 to the controller 400. The memory means 401 stores configuration information regarding the types, numbers and polling order for sensors coupled to the controller.

In a preferred embodiment, the memory means 401 is electrically-erasable programmable read-only memory ("EEPROM"). During manufacture of the NDU 318, a computer, such as a personal computer, is coupled to the controller 400 through programming lines 403, enabling information to be written to the memory means 401 for nonvolatile storage therein. Those ordinarily skilled in the art are familiar with various alternative apparati and methods for providing a memory means 401 for programmably storing configuration information for the controller 400. Because the memory means of 401 is programmable, the NDU 318 is capable of adapting to a variety of different sensor types and numbers. During operation, the controller 400 retrieves information from the memory means 401 concerning addresses and code response words from the sensors, allowing the controller 400 to address and retrieve sensor data from the sensors in turn. Additionally, the memory means 401 dictates the order in which sensors are polled.

The controller 400 is provided with four on-board sensors. The first on-board sensor is a forward saltwater invasion sensor used to detect when the jacket 250 has been compromised at a forward end. The sensor (Rho cell 327) is coupled (via line 329) to an input 404, providing a voltage thereto representing permeability of the sensor. This voltage is compared (via line 405) with a reference voltage from a source 412 in a comparator 406 and delivered therefrom to a first sensor input 407 of the controller 400.

The second on-board sensor is an aft saltwater invasion sensor used to detect when the jacket 250 has been compromised at an aft end. The sensor (Rho cell 326) is coupled (via line 328) to an input 408, providing a voltage thereto representing permeability of the sensor. This voltage is compared (via line 409) with a reference voltage from a source 412 in a comparator 410 and delivered therefrom to a second sensor input 411 of the controller 400.

The third on-board sensor is a local, regulated inside-the-module voltage sensor. The voltage, in the preferred embodiment, is 6.8 volts delivered from the zener diode 311 via input 413, digitized in an 8-bit analog-to-digital converter 414 and delivered to a third sensor input 415 on the controller 400.

The fourth on-board sensor is adapted to measure line voltage applied to the entire array at the module point. This voltage varies from several hundred volts at a forward end of the array to a few hundred volts at an aft end of the array and is delivered from a divider network 416 through an input 417 into a differential amplifier 418. Output from the differential amplifier 418 is digitized in an 8-bit analog-to-digital converter 419 and delivered to a fourth sensor input 420 on the controller 400.

The controller is also provided with a fifth sensor input 430 in the illustrated embodiment. This fifth sensor input 430 is employed to allow a variable number of off-board sensors communicate in a serial manner with the controller 400.

An NDU clock output 423 is delivered to an differential buffer 422 (provided for Manchester-encoding) and delivered through lines 421 to external, off-board sensors. The lines 421 allow a clock signal to synchronize operation of the off-board sensors. Likewise, an NDU address output 426 is delivered to an differential buffer 425 (again, provided for Manchester-encoding) and through lines 424 to the external, off-board sensors. This allows the controller 400 to address the various sensors as a function of information stored in the memory means 401. The controller 400 polls the off-board sensors in an order determined by the memory means 401; the off-board sensors return input values representing various physical characteristics desired to be sensed to the fifth sensor input 430 via lines 427, an inductive coupling 428 (provided for signal isolation) and a inverter with noise immunity 429. The fifth sensor input 430 is polled, along with the other sensor inputs 407, 411, 415, 420 in an order determined by the preprogrammed memory means 401.

Manchester-encoding is used because the buses within individual modules in the array are inductively coupled to one another, preventing unwanted DC-bias leakage currents from flowing therein. Data that is not Manchester-encoded is not guaranteed to have an average duty cycle of 50%. Unless the data has such an average duty cycle, the DC-bias of the data itself will be deleted by the inductive couplings, thereby corrupting the data.

A power-on/reset input 431 allows the controller 400 to be turned off and on and reset. During reset, instructions stored in a memory 432 are read into the controller 400. These instructions direct the controller 400 as to how to poll its various sensor inputs 407, 411,415,420,430 and how to deliver the input values to the receiver 316 of FIG. 3. The controller 400 is designed to read these instructions from the memory 432 once during power-on.

The downlink bus 303 is coupled to a downlink input 433. The downlink input 433 receives downlink signals from the seismic exploration vehicle 100, delivering them to a downlink receiver 435 via an optical coupler 434, used for isolation purposes. The downlink receiver 435 (such as Super Tex part no. DC7, in a preferred embodiment) acts a trigger or inverter. As mentioned previously, downlink commands include reset, calibration and data rate commands. The controller 400 receives these commands and acts in accordance therewith.

The controller 400 is provided with a connection 437 to the local data bus 325 via differential buffer 438 and lines 439. The local data bus 325 is Manchester-encoded via the differential buffer 438 and couples the NDU 318 and the receiver 316, providing the main link therebetween.

The local timing bus 324 delivers a frame synchronization signal from the driver 314 to an input 440. The input 440 is inductively-coupled (via transformer 441) to a inverter with noise immunity 442 which, in turn, is coupled to a frame synchronization input 443 on the controller 400. This allows the NDU 318 as a whole to act in concert with the DAUs 319,320,321,322 to deliver synchronous data to the receiver 316.

Also for synchronization purposes, a clock signal is delivered from a clock source (1,024 MHz, in a preferred embodiment) to an input 444. The input 444 is inductively-coupled (via transformer 445) to a inverter with noise immunity 446 which, in turn, is coupled to a clock input 447 on the controller 400. This drives the controller 400 at a desired rate.

When the frame synchronization signal is active (meaning that a frame of data has arrived from another module and that data from this module needs to be added thereto), the controller 400 polls one of the sensor inputs, placing the input value read onto the local data bus 325 as directed. This input value is added to acoustic data taken from the DAUs 319, 320, 321,322 and combined with the frame in the CRU 317. This roundabout way of injecting data into the main data stream is necessitated by the extreme lengths of the buses (up to 50 meters from the central point of the module) and the corresponding substantial propagation times involved.

From the above, it is apparent that the present invention provides a programmable data collection and relay circuit comprising (1) a plurality of sensor inputs, each of the sensor inputs adapted to be coupled to a sensor capable of sensing a physical characteristic within the towed hydrophone array, (2) means for polling at least a portion of the plurality of sensor inputs to determine values of the inputs, (3) means for storing programmed data concerning which of the plurality of inputs is to be polled and (4) means for serially placing the input values in condition for insertion into a data stream transmitted along the towed hydrophone array.

Although the present invention and its advantages have been described in detail, it should be understood that various changes, substitutions and alterations can be made herein without departing from the spirit and scope of the invention as defined by the appended claims.

What is claimed is:

1. A programmable data collection and relay circuit for a towed hydrophone array, comprising:

a plurality of sensor inputs, each of said sensor inputs adapted to be coupled to a sensor capable of sensing a physical characteristic selected from the group consisting of temperature, depth, voltage, fluid invasion and tension, within said towed hydrophone array;

means for polling at least a portion of said plurality of sensor inputs to determine values of said inputs;

means for storing programmed data concerning which of said plurality of inputs is to be polled; and means for serially placing said input values in condition for insertion into a data stream transmitted along said towed hydrophone array.

2. The circuit as recited in claim 1 further comprising means for storing programmed data concerning an order in which to poll said plurality of inputs.

3. The circuit as recited in claim 1 further comprising means for synchronizing an operation of said circuit with said data stream.

4. The circuit as recited in claim 1 further comprising means for receiving downlink commands, said downlink commands governing an operation of said circuit.

5. The circuit as recited in claim 1 further comprising a combiner/repeater unit for inserting said input values into said data stream.

6. The circuit as recited in claim 1 further comprising voltage and fluid invasion sensors coupled to ones of said plurality of sensor inputs.

7. The circuit as recited in claim 1 further comprising a sensor channel coupled to one of said plurality of sensor inputs, said sensor channel allowing a plurality of external sensors to be coupled thereto, said sensor channel coupling a selected one of said plurality of external sensors to said one sensor input at a time.

8. The circuit as recited in claim 1 wherein said circuit is implemented in a programmable gate array.

9. The circuit as recited in claim 1 wherein said storing means comprises programmable read-only memory (PROM).

10. A method of operating a programmable data collection and relay circuit for a towed hydrophone array, comprising the steps of:

retrieving stored programmed data concerning which of a plurality of sensor inputs is to be polled, each of said sensor inputs adapted to be coupled to a sensor capable of sensing a physical characteristic selected from the group consisting of temperature, depth, voltage, fluid invasion and tension, within said towed hydrophone array and providing a value to said sensor input in response thereto; and polling one of said plurality of sensor inputs as a function of said data; and serially placing said input values in condition for insertion into a data stream transmitted along said towed hydrophone array.

11. The method as recited in claim 10 further comprising the step of storing programmed data concerning an order in which to poll said plurality of inputs.

12. The method as recited in claim 10 further comprising the step of synchronizing an operation of said circuit with said data stream.

13. The method as recited in claim 10 further comprising the step of receiving downlink commands, said downlink commands governing an operation of said circuit.

14. The method as recited in claim 10 further comprising a combiner/repeater unit for inserting said input values into said data stream.

15. The method as recited in claim 10 further comprising the step of coupling voltage and fluid invasion sensors to ones of said plurality of sensor inputs.

16. The method as recited in claim 10 further comprising the step of coupling a sensor channel to one of said plurality of sensor inputs, said sensor channel allowing a plurality of external sensors to be coupled thereto, said sensor channel coupling a selected one of said plurality of external sensors to said one sensor input at a time.

17. The method as recited in claim 10 wherein said circuit is implemented in a programmable gate array.

18. The method as recited in claim 10 wherein said data is stored in programmable read-only memory (PROM).

19. A towed hydrophone array, comprising:

a hydrophone module, said module comprising a cylindrical sleeve having a plurality of hydrophone assemblies and a suspending material therein, said suspending material adapted to resiliently secure said hydrophone assemblies within said sleeve, said sleeve further containing a fluid therein, said fluid giving said hydrophone module a preselected specific gravity, said hydrophone module including a programmable data collection and relay circuit, comprising:

a plurality of sensors, each of said sensors capable of sensing a physical characteristic within said towed hydrophone array;

a programmable controller coupled to each of said plurality of sensors to be capable of polling at least a portion of said plurality of sensors to determine values of said inputs;

a memory capable of storing programmed data concerning which of said plurality of sensors is to be polled;

a procedure operable within said programmable controller capable of selectively polling at least said portion as a function of said stored program data and serially placing said input values in condition for insertion into a data stream transmitted along said towed hydrophone array; and means for acting in accordance with downlink commands to reset said circuit, said circuit residing within a fluid-resistant container suspended in said suspending material within said hydrophone module.

20. The array as recited in claim 19 wherein said memory is further capable of storing programmed data concerning an order in which to poll said plurality of sensors.

21. The array as recited in claim 19 wherein said physical characteristic is selected from the group consisting of:

temperature, depth, voltage, fluid invasion, and tension.

22. The array as recited in claim 19 further comprising means for synchronizing an operation of said circuit with said data stream.

23. The array as recited in claim 19 further comprising means for receiving downlink commands directing said circuit to calibrate said plurality of sensors.

24. The array as recited in claim 19 wherein said hydrophone module further comprises a combiner/repeater unit coupled to said circuit for receiving said input values and for synchronously interleaving said input values into said data stream.

25. The array as recited in claim 19 further comprising voltage and fluid invasion sensors coupled to ones of said plurality of sensor inputs.

26. The array as recited in claim 19 further comprising a sensor channel coupled to one of said plurality of sensor inputs, said sensor channel allowing a plurality of external sensors to be coupled thereto, said sensor channel coupling said plurality of external sensors to said one sensor input in a predetermined temporal order.

27. The array as recited in claim 19 wherein said programmable controller is a programmable gate array.

28. The array as recited in claim 19 wherein memory is programmable read-only memory (PROM).

* * * * *

UNITED STATES PATENT AND TRADEMARK OFFICE
CERTIFICATE OF CORRECTION

PATENT NO. : 5,592,437
DATED : January 7, 1997
INVENTOR(S) : Bruce Elliott

It is certified that error appears in the above-indentified patent and that said Letters Patent is hereby corrected as shown below:

Col. 10, line 2, "1,024" should be --1.024--.

Signed and Sealed this

Eighth Day of April, 1997

Attest:

BRUCE LEHMAN

*Attesting Officer*  Commissioner of Patents and Trademarks